United States Patent [19]

Berry

[11] 3,714,029
[45] Jan. 30, 1973

[54] ZINC-CONTAINING ZEOLITE CATALYST

[75] Inventor: Thomas E. Berry, East Alton, Ill.
[73] Assignee: Shell Oil Company, New York, N.Y.
[22] Filed: Sept. 15, 1971
[21] Appl. No.: 180,828

Related U.S. Application Data

[60] Division of Ser. No. 1,854, Jan. 9, 1970, Pat. No. 3,654,185, which is a continuation-in-part of Ser. No. 803,091, Feb. 27, 1969.

[52] U.S. Cl..........208/111, 208/DIG.2, 260/683.65, 208/138
[51] Int. Cl.......C07C 5/22, C10g 13/02, B01j 11/40
[58] Field of Search..........208/138, 111; 260/683.65

[56] References Cited

UNITED STATES PATENTS 3,395,096   7/1968   Gladrow et al..........................23/111
3,449,070   6/1969   McDaniel et al.....................208/111
3,507,802   4/1970   Smith et al. .........................252/455

Primary Examiner—Delbert E. Gantz
Assistant Examiner—G. E. Schmitkons
Attorney—Glen R. Grunewald et al.

[57] ABSTRACT

A crystalline-alumino-silicate zeolite catalyst support having high crystalline stability and acidic catalytic activity is prepared from an alkali zeolite, preferably a Y-faujasite, by (1) removing the alkali metal ions to below about 1.0%w by ion exchange, and (2) incorporating zinc ions and calcining at a high temperature of about 800°C. The support can then be combined with hydrogenative metals such as Group VIII and Group VIB, followed by drying and calcining to provide superior hydroisomerization and hydrocracking catalysts.

7 Claims, No Drawings

ZINC-CONTAINING ZEOLITE CATALYST

CROSS REFERENCE TO RELATED APPLICATIONS

This application is a division of application Ser. No. 1,854 filed Jan. 9, 1970 (now U.S. Pat. No. 3,654,185), which is a continuation-in-part of application Ser. No. 803,091, filed Feb. 27, 1969.

BACKGROUND OF THE INVENTION

1. Field of the Invention

This invention relates to a new highly active and stable zinc-containing crystalline alumino-silicate zeolite catalyst.

2. Description of the Prior Art

Crystalline alumino-silicate zeolites have in recent years become of major importance as catalysts and catalytic components for hydrocarbon conversion reactions. Both naturally occuring and synthetically prepared zeolites have demonstrated extraordinary catalytic properties.

Synthetic zeolites are favored since the crystal structure and compositional purity can be carefully controlled to achieve desired properties.

Synthetic zeolites are almost universally prepared in the alkali metal (sodium or potassium) form by crystallizing zeolite from an aqueous reaction mixture containing alumina (as sodium aluminate, alumina sol, etc.), silica (as sodium silicate, silica gel or silica sol), and alkali metal oxides such as sodium hydroxide. The presence of alkali metal oxide initially helps to stabilize the zeolite structure but, as is well known, the alkali metal must be replaced, at least partially, to achieve appreciable catalytic activity.

Synthetic faujasites as prepared typically contain in the range of about 5–13%w alkali metal ions. Exchange of the alkali metal for hydrogen ions has long been recognized as a means of markedly improving catalytic activity. However, when alkali metal is reduced to levels below about 2%w, the crystal structure becomes unstable and is easily collapsed upon heating, resulting in a substantially amorphous silica-alumina of much reduced catalytic activity. This phenomenon has been ascribed to a difference in the chemical nature of the bound alkali metal ions in the crystal structure. It has been proposed that the bulk of the alkali ions occupy positions in the structure which do not fundamentally affect the structural stability, i.e., in "caged" positions while the remaining sodium (ca 1%w) occupies "bridge" positions in the crystal and when removed result in structural collapse (see Broussard et al, U.S. Pat. No. 3,287,255). al, It has recently been suggested that very highly stable zeolites can be produced by a sequence of ion exchange steps to replace alkali metal ions in the zeolite interposed with a step of heating the zeolite to a temperature within the range of about 1300°F (704°C) to 1600°F (871°C). The intermediate heating or calcination step permits alkali metal removal to previously unobtainable levels (see Maher et al, U.S. Pat. No. 3,293,192). Zeolites having very low alkali metal contents are unstable even to the intermediate calcination step so that other special procedures, such as steeping the highly exchanged zeolite in the exchange solution, are required (Maher et al, U.S. Pat. No. 3,374,056).

I have now discovered a method of producing a zeolite of the faujasite type having very low alkali metal content which is stabilized by the inclusion of zinc ions combined with high temperature calcination. The resulting zeolite has a highly stable crystal structure and exhibits superior catalytic activity.

SUMMARY OF THE INVENTION

In broad aspect the present invention is a crystalline alumino-silicate zeolite having low alkali metal content, a stable crystal structure and highly active catalytic activity resulting from the inclusion of zinc and calcination at a temperature of about 800°C. The zeolite is prepared from an alkali form of crystalline zeolite having a faujasite crystal structure by (1) substantially removing alkali metal ions by ion exchange, (2) incorporating zinc ions from an aqueous solution and (3) calcination at about 800°C. The catalysts of this invention are used for the hydroisomerization of $C_4$–$C_7$ normal paraffins as well as for conventional hydrocracking. Preferably, these catalysts are used for single-stage hydrocracking of nitrogen containing feedstocks or multi-stage hydrocracking where the gaseous conversion products are not removed from the first stage before passing the effluent to a subsequent stage. Zinc contents of the catalysts prior to calcination range between about 0.5 to 15%w. Preferably, catalysts used for hydroisomerization of normal paraffins will have a zinc content from about 1–6%w prior to calcination, while catalyst used for hydrocracking feedstocks having greater than 50 ppm organic nitrogen will have a zinc content from about 6–15%w.

DETAILED DESCRIPTION

Synthetic crystalline zeolites having structures similar to that of the mineral faujasite are the starting materials for the composition of the present invention. The preferred Y-faujasite has a composition (based on unit cell formula) of $Na_{57}(AlO_2)_{57}(SiO_2)_{139} \cdot x\, H_2O$. Y-faujasite has relatively higher silica content and more inherent structural stability than other zeolites of the faujasite type. Preparation of Y-zeolite and its properties are disclosed in U.S. Pat. No. 3,310,007.

According to the present invention, alkali metal ions in the zeolite structure are first removed by ion exchange. Ion exchange may be carried out with any ionic solution but it is preferred that metal ion exchange not be used since the replacement of alkali metal ion by other metal ions (except zinc) have undesirable aspects. For example, silver nitrate solution is very efficient for removal of alkali metal ion but introduces silver ions which interfere with the desired structural changes accomplished by the invention. Ammonium salt solutions, such as for example, ammonium nitrate, carbonate, sulfate, halides, etc., are suitable for ion exchange. In most cases, multiple exchanges are desirable. The exchange is carried out by any conventional exchange procedure, either batchwise or continuous and preferably at elevated temperatures in the range of 100°C, as for example, by refluxing the zeolite in an exchange solution. Batchwise exchange may be carried out by slurrying the zeolite with an appropriate ammonium compound such as 2 M ammonium nitrate, separating the solution by filtration or settling, then washing with water. This procedure is repeated several times.

Following removal of the alkali metal ions the zeolite is exchanged with an ionic solution of a zinc salt to incorporate zinc ions into the crystal structure. It should be noted the exchange with zinc tends to further reduce the alkali metal content of the zeolite in cases where substantially complete removal has not been achieved in the first exchange. However, the first exchange is required before exchange with zinc ions.

Any common salt of zinc which will form an ionic aqueous solution may be used for the incorporation of zinc. For example, zinc nitrate, zinc acetate and the like are suitable. These salts are especially suitable since the ions decompose upon calcination and thus do not interfere with the catalytic activity of the finished composition. The zinc solution should be chosen to give a reasonably high concentration of zinc ions (ca 1.0 M or higher) without the necessity for highly acidic conditions. The solution should be maintained above about 3-4 pH. Solutions having a pH as low as 2 tend to dissolve alumina and cause collapse of the crystalline structure.

While it is recognized that the prior art has suggested the replacement of alkali metal ions in zeolites with various polyvalent ions including zinc, the present composition is unlike the prior art compositions in several respects. The zinc ions are not directly exchanged for alkali ions but are introduced after prior removal or reduction of the alkali ions. In addition, it has been found that zinc ions in combination with a high temperature calcination produces changes in the crystal structure which give it exceptional stability and catalytic activity. The calcination is critical to the invention and will be subsequently described. Moreover, zinc exhibits behavior in the final overall preparation that is experimentally distinguishable from other metal ions, such as magnesium, aluminum and beryllium which have been thought equivalent to zinc in stabilizing zeolites. In the present invention exceptional stability is achieved by the coordination of zinc incorporation and an intermediate high temperature calcination before incorporating hydrogenation metals to produce a compositional entity not known to the art.

The amount of zinc exchanged into the zeolite prior to the intermediate calcination should be at least above about 0.5%w and preferably not above about 15 percent. It is preferred that the amount of zinc be in the range of about 1–6%w prior to calcination. Additional zinc can be incorporated into the zeolite, if desired, subsequent to the stabilizing intermediate calcination at about 800°C.

Following incorporation of zinc to the desired level the zeolite may be washed to remove any unexchanged ions prior to calcination. Water which is substantially free of metallic ions has proved a very suitable wash medium. However, washing with non-alkali metal ammonium ion solution is also suitable. For example, washing with a 2 M solution of ammonium nitrate at about 20°C gave especially good results. At this temperature little or no further removal of alkali metal ions is accomplished. While this washing step is not essential, it is preferred.

The amount of alkali metal in the zeolite following zinc incorporation will be below about 1%w. Most favorable results for hydroisomerization catalysts are obtained when the final composition contains below about 0.5%w alkali metal and particularly about 0.2–0.3%w as will be shown in the accompanying examples. Alkali metal contents below 0.5%w are also preferred for hydrocracking catalysts.

An intermediate calcination of a zeolite having zinc ions selectively placed in the crystal structure is a critical and essential feature of the method of the invention. It is this step which gives the zinc zeolite its exceptional structural stability. The reason for the stabilization of the structure by intermediate calcination is not clearly understood but is believed to be related to a rearrangement of the molecular coordination, at least in part, from a tetrahedral to trigonal bonding of the silicon-aluminum-oxygen system. It is believed that the inclusion of zinc ions plays an important part in the structural transformation. It has been found, for example, that the inclusion of magnesium, having properties ostensibly the same as zinc, interferes with, rather than coordinates with this transformation. Thus, the cooperation of the zinc ion and the structural change brought about by the calcination at about 800°C work in combination to produce the product of the invention. In any case, the intermediate calcination is required before the hydrogenation metals are incorporated and the temperature must be controlled over a narrow critical range. Calcination below about 775°C is not effective to accomplish the desired results and temperatures above about 825°C result in structural damage. Therefore, calcination should be closely controlled to about 800°C. Atmospheric pressure is suitable for the calcination treatment, pressure not being a variable of critical importance. The time of calcining after reaching about 800°C is not especially critical, but should be continued for sufficient time to remove water physically associated with the catalyst — 1 hour should suffice but longer periods can be used. It is especially preferred that calcination be carried out for about 1–5 hours in still air.

The zinc content of the finished catalyst composition may be varied following calcination. Thus, the amount of zinc may be reduced by exchange for other metal cations or for hydrogen. For some applications, it may be desirable to exchange additional zinc into the zeolite. For example, zinc contents on the finished catalyst from about 6–9%w are preferred for hydrocracking feedstocks having greater than 50 ppm organic nitrogen.

When hydrogenation metals are incorporated, as discussed below, some zinc is usually removed, reducing the level below that present prior to calcination. Ion exchange procedures as disclosed for initial incorporation of zinc, above are suitable, for variation in zinc level after calcination. Insofar as crystal stability is concerned, the amount of zinc in the final composition is not especially critical, the level during the calcination at about 800°C being the determinative factor.

For many catalytic applications the novel zeolite material of the invention is preferably composited with hydrogenative metal components such as metals of Group VIB (Cr, Mo, W) and Group VIII (Ni, Co, Fe, Pt and Pd) of the Periodic Table of Elements. Noble metals of Group VIII (Pt and Pd) are especially suitable for hydroisomerization. Nickel-tungsten composites are especially suited for hydrocracking. The hydrogenative metals can be composited with the zeolite by various means known in the art. Palladium, for instance, is conveniently incorporated by impregnation of the zeolite with ammoniacal palladium chloride solution. When noble metals of Group VIII are used, it is preferred that the metal content be about 2%w or less. A composite containing 0.25–1.0%w palladium on zeolite treated according to the invention provides a highly active and efficient hydroisomerization catalyst. A composite containing about 15–30%w nickel and about 0.05–6%w Group VIB metal provides an active and stable hydrocracking catalyst. The catalyst is again dried and calcined after the incorporation of hydrogenation metal. For this final calcination temperatures in the range of about 400°–600°C are suitable. Higher temperatures are not desired and can indeed result in loss of catalytic activity.

Catalysts prepared according to the invention are conveniently used in the form of discrete particles, such as granules, extrudates, pellets and the like, usually ranging in size from about 1/16 inch to about 1/4 inch in average diameter. These particles are preferably disposed in a stationary bed within a suitable reactor capable of withstanding high pressure. Of course, smaller catalyst particles may be used in fluidized or slurry reactor systems. The catalysts may also be composited with a refractory oxide, such as by copelleting. This is particularly suitable where the catalysts are to be used in a fixed bed of discrete particles in which hardness and resistance to attrition are desirable. For example, pellets comprising about 25%w alumina and about 75%w zeolite having an incorporated hydrogenation metal component, have been found particularly appropriate as isomerization catalysts. However, the concentration of zeolite in relation to the concentration of refractory oxide can be varied as desired. Mixtures of refractory oxides, such as silica-alumina, can also be used if desired.

The catalysts of the invention are very suitable for hydroconversion processes. These zinc-containing zeolites, especially those composited with a noble metal such as palladium of platinum, are active and suitable for both paraffin isomerization and hydrocracking. Nickel-tungsten composites with these zeolites are also very effective hydrocracking catalysts. These catalysts are especially effective for hydrocracking feedstocks having high organic nitrogen contents, i.e., up to about 3000 ppm.

Feed to an isomerization process using catalysts of the invention can be a substantially pure normal paraffin having from four through seven carbon atoms, mixtures of such normal paraffins, or hydrocarbon fractions rich in such normal paraffins. Suitable hydrocarbon fractions are the $C_4$ to $C_7$ straight-run fractions of petroleum. The catalysts can also be used in the isomerization of xylenes, e.g., the conversion of ortho and meta-xylenes to para-xylenes.

Hydroisomerization of normal paraffins is conducted at a temperature in the range from about 200°C to 350°C and preferably from about 225°C to 315°C. At lower temperatures, conversion of normal paraffins is generally too low to be practical, although selectivity to isoparaffins is substantially 100 percent. At higher temperatures, conversion of normal paraffins is quite high; however, excessive cracking is encountered and selectivity to isoparaffin is extremely low as a result.

The isomerization reaction can be conducted over a wide range of space velocities, but in general the space velocity is in the range from about 0.5 to 10 and preferably from about 1 to 5. In general, conversion of normal paraffins decreases with an increase in weight hourly space velocity (WHSV), although selectivity to the isoparaffin is increased.

The isomerization reaction is carried out in the presence of hydrogen; however, there is little or no net consumption of hydrogen in the process. Any consumption of hydrogen is the result of hydrocracking reactions and it is preferred to keep such reactions to a minimum. The function of the hydrogen is primarily to improve catalyst life, apparently by preventing polymerization of intermediate reaction products which would otherwise polymerize and deposit on the catalyst. A hydrogen to oil mole ratio of from about 1:1 to 25:1 and preferably from about 2:1 to 15:1 is used. It is not necessary to employ pure hydrogen since hydrogen-containing gases, e.g., hydrogen-rich gas from the catalytic reforming of naphthas, are suitable. Total pressure is in the range from about atmospheric to 1000 pounds per square inch gauge (psig) and preferably from about 300 to 750 psig.

The activity of zeolitic catalysts is greater than that of the amorphous catalysts in conventional two-stage hydrocracking, but the incentive has been reduced due to the increased production of $C_1$-$C_4$ hydrocarbons through secondary cracking reactions. By providing a basic environment, either through ammonia or organic nitrogen, compounds, this secondary cracking can be greatly reduced. Besides improving the product quality of the hydrocracked product in conventional hydrocracking processes, the zinc-containing zeolitic catalysts of the invention can be used in other process configurations. Two such configurations are single-stage hydrocracking of feedstocks containing up to 3000 ppm organic nitrogen and multi-stage hydrocracking of such feedstocks without removing the gaseous conversion products from prehydrogenation of the feed.

Suitable feedstocks for hydrocracking processes employing catalysts of the invention include any hydrocarbon boiling above the boiling range of the desired products. For gasoline production, hydrocarbon distillates boiling in the range of about 200°–510°C are preferred. Such distillates may have been obtained either from distillation of crude oils, coal tar, etc., or from other processes generally applied in the oil industry such as thermal, catalytic, or hydrogenative cracking, visbreaking, deasphalting, deasphaltenizing or combinations thereof. Since these catalysts are active and stable in the presence of nitrogen and sulfur compounds, hydrofining the feedstock is optional.

Operating conditions appropriate for a hydrocracking process using the present catalyst include temperatures in the range of about 260°C to 450°C, hydrogen partial pressures of about 500 to 2000 psi, liquid hourly space velocities (LHSV) of about 0.2 to 10, preferably 0.5 to 5, and hydrogen/oil molar ratios of about 5 to 50.

Feed can be introduced into the reaction zone as a liquid, vapor or mixed liquid-vapor phase depending upon the temperature, pressure and amount of hydrogen mixed with the feed and the boiling range of the feedstock utilized. The hydrogen feed, including fresh as well as recycle feed, is usually introduced into the reaction zone with a large excess of hydrogen since the hydrocracking is accompanied by a rather high consumption of hydrogen, usually of the order of 500–2000 standard cubic feet of hydrogen per barrel of feed. Again, any suitable hydrogen containing gas which is predominantly hydrogen can be used. The hydrogen rich gas may optionally contain nitrogen contaminants from a feed pretreating process.

The following examples further illustrate the practice and advantages of the invention. Examples 1–4 relate to hydroisomerization, while Examples 5–8 relate to hydrocracking.

EXAMPLE 1

A powdered sodium form of Y-faujasite zeolite obtained from the Linde Company and designated SK–40 was used as starting material in all experiments.

A quantity of SK–40 was twice contacted with 2 M $NH_4NO_3$ at 100°C for 0.5 hour each.

Three aliquots of the exchanged zeolite were incorporated with aluminum, magnesium and zinc, respectively. Aluminum ions were incorporated from a solution of 1 M $Al_2(SO_4)_3$, magnesium and zinc from their respective nitrates. The aluminum sulfate solution had a pH of about 2.0 to obtain sufficient solubility. The other solutions had a pH of about 4.0. After introduction of the metal cations, the samples were washed with water to remove unexchanged cations and split into two aliquots, one of which was calcined at 550°C and the other at 815°C. Each aliquot was then twice exchanged with 1 M $NH_4NO_3$ and washed with water to remove the residual sodium and again split into two aliquots, one of which was calcined at 550°C and the other at 815°C. The cationic compositions and relative crystallinities were determined after the first and the second calcination.

The catalytic activities were determined after the second calcination by conversion of n-pentane to iso-pentane. Since some decline in catalytic activity occurred with all samples due to coking, the conversion was measured for all catalysts after three hours of processing n-pentane.

The results obtained for the Al/Y, Mg/Y and Zn/Y-faujasite systems are summarized in Table 1.

tion were higher for the 550°C treatment than the 815°C treatment. However, in all cases, the subsequent losses in relative crystallinity during the final calcination were less for those samples that had been treated at 815°C during the intermediate calcination than for those treated at 550°C. This effect is most apparent in the Al/Y system. The relative crystallinities after intermediate calcination at 550°C and 815°C were completely amorphous after the final calcination while the two aliquots treated at 815°C retained relative crystallinities of 13 and 10. These observations suggest that the 815°C treatment causes a greater intrinsic loss in crystallinity than 550°C treatments, but at the same time, produces a change in the zeolite structure which increases its stability towards further treatment. It is apparent that the combination of an 815°C intermediate calcination and a 550°C final calcination produced the most active catalyst in all systems.

The results obtained in the Al/Y-faujasite system show significant loss in activity due to structural damage caused by the $Al_2(SO_4)_3$ treatment.

The Mg/Y-faujasite appears to behave differently than any of the other systems. The ease of removal of sodium after the intermediate calcination is far less for this system than the others, as evidenced by the higher sodium content of the final samples in this series. This result indicates that the presence of $Mg^{+2}$ ions block the stabilizing transformation which occurs during the high temperature calcination.

Because the actual activity of the supports were somewhat obscured by deactivation due to coking during the catalyst testing, three of the most promising supports were ion-exchanged with ammoniacal palladium chloride and recalcined. After reduction of the palladium, these samples were again tested for isomerization of n-pentane to iso-pentane. The results were as follows.

TABLE 2

| Catalyst No. | Zeolite Base | Intermediate Calcination Temperature | Percent i-$C_5$ [a] |
|---|---|---|---|
| 3–B (1) | Zn/Y-Faujasite | 815°C | 43.5 |
| 2–A (1) | Mg/Y-Faujasite | 550°C | 10.1 |
| 2–B (1) | Mg/Y-Faujasite | 815°C | 16.5 | a) Feed = n-pentane, WHSV = 3.5, temperature = 275°C, and $H_2$/feed = 5.5.

The results demonstrate a significant activity ad-

TABLE 1

| Catalyst | 1 | | 2 | | 3 | |
|---|---|---|---|---|---|---|
| | A | B | A | B | A | B |
| 1st calcination: [a] | | | | | | |
| °C | 550 | 815 | 550 | 815 | 550 | 815 |
| Percent Na | 1.3 | 1.3 | 2.1 | 1.9 | 0.5 | 0.5 |
| Percent metal | [d] 9.7 | [d] 9.8 | [e] 3.8 | [e] 3.2 | [f] 9.5 | [f] 9.7 |
| Relative crystallinity [b] | 23 | 18 | 107 | 106 | 103 | 89 |
| | (1) | (2) | (1) | (2) | (1) | (2) | (1) | (2) | (1) | (2) | (1) | (2) |
| 2nd calcination: [a] | | | | | | | | | | | | |
| °C | 550 | 815 | 550 | 815 | 550 | 815 | 550 | 815 | 550 | 815 | 550 | 815 |
| Percent Na | 0.3 | 0.3 | .5 | .5 | .4 | .4 | .4 | .5 | 0.1 | 0.1 | 0.1 | 0.2 |
| Percent metal | [d] 10.6 | [d] 9.3 | [d] 10.5 | [e] .3 | [e] .3 | [e] .2 | [e] .2 | [e] .2 | [f] 1.5 | [f] 2.1 | [f] 0.8 | [f] 0.8 |
| Relative crystallinity [b] | 0 | 0 | 13 | 10 | 81 | 83 | 82 | 89 | 82 | 61 | 70 | 50 |
| Activity [c] | 3.3 | 1.5 | 5.2 | 2.2 | 15.0 | 9.1 | 15.5 | 8.5 | 16.0 | 16.0 | 18.7 | 13.0 |

[a] Calcined for 3 hours.
[b] Crystallinity as determined by X-ray diffraction relative to untreated SK–40.
[c] Percent conversion of n-pentane after 3 hours at 300° C, 300 p.s.i.g., 3.5 WHSV and $H_2$/pentane ratio of 4.0.
[d] Aluminum.   [e] Magnesium.   [f] Zinc.

Several general observations are noteworthy. The relative crystallinities determined after the first calcinavantage for the Zn-Y-faujasite base. The two Mg/Y-faujasite samples show nearly the same activity regardless of the intermediate calcination temperature. The Zn/Y-faujasite systems show appreciable increase in activity after an 815°C calcination which again suggests that the structural transformation which occurs during the 815°C calcination is blocked by the presence of $Mg^{+2}$ ions.

These results clearly show the advantage of zinc incorporation combined with a high temperature calcination and demonstrate that the final compositional entities are distinct species which depend upon the ions included and calcination temperature.

EXAMPLE 2

Two zinc zeolites were prepared by first exchanging SK-40 sodium zeolite powder with $NH_4NO_3$ at 100°C, followed by contacting with a 2 M aqueous solution of zinc acetate and washing with 1 M $NH_4NO_3$ solution.

Samples of this material were calcined at 550°C and at 800°C and incorporated with platinum, then recalcined at 550°C as described in Example 1. Approximately 0.5%w Pt was incorporated into all samples in a standard manner ($4.3 \times 10^{-3}$ M $[Pt(NH_3)_4Cl_2]$ in 1 M $NH_4NO_3$) to eliminate deactivation due to coking during the 4-hour tests.

The acidic activity of these faujasites was monitored by the extent of isomerization of n-$C_6$ to i/$C_6$'s in a blend of 65%v n-$C_6$, 30%v n-$C_5$, and 5%v methylcycolpentane at 250°C, 450 psig, 1.0 WHSV, and 2.5 $H_2$/feed ratio. The 550°C calcined finished catalyst contained 0.14% Na, 1.6% Zn and had an activity (expressed as percent hexane equilibrium obtained) of 38.8. The 800°C calcined catalyst contained 0.14% Na, 2.1% Zn and had an activity of 67.6, thus demonstrating the importance of the 800°C calcination. It is also noteworthy that this effect is unique to the zinc catalyst.

Similarly prepared catalyst containing magnesium or beryllium showed essentially no difference between 800°C and 550°C calcination. Thus, both the incorporation of zinc and the use of calcination of about 800°C is required to produce the composition of the present invention.

EXAMPLE 3

Another set of zinc-containing zeolites was prepared in the same manner as for Example 2 except that the number of $NH_4NO_3$ exchanges was varied to obtain different sodium contents prior to the 800°C calcination. These catalysts were then tested as in Example 2. Catalyst 4A contained 0.6% Na prior to calcination, 5.5-6.0% zinc, and about 0.5% platinum, and had an activity of 52.8. For catalyst 4B which contained 0.26% sodium prior to calcination, the activity was 63.0.

EXAMPLE 4

A comparison was made of zeolites having about 0.26% sodium prior to calcination but with varying zinc content. Catalyst 5A containing about 5.9% zinc had an activity of 6.30 (same catalyst as discussed above). Catalyst 5B containing about 8.7% zinc had an activity of 48.4. Thus, a low zinc content from about 3-6%w is preferred for hydroisomerization.

EXAMPLE 5

This example demonstrates the improved activity and stability of high-zinc content stabilized catalysts of the invention (6-9%w Zn) over the low-zinc catalysts (<6%w Zn) in single-stage hydrocracking. A powdered form of SK-40 Y-faujasite zeolite was employed in preparation of the base. This base was exchanged 8 times with 2 M $NH_4NO_3$ at 100°C for 1/2 hour each, refluxed with 1 M zinc acetate for 15 minutes, filtered, and washed with 0.5 M $NH_4NO_3$ solution. The base was then dried for 5 hours at 120°C, cooled, and calcined for 3 hours at 800°C. Approximately 20%w $Al_2O_3$ was added as a hydrogel (pH - 9.0) to the zeolite powder as a binding agent to increase the crush strength of the final catalyst. After aging the resultant gel for 2 hours and washing, the material was dried at 120°C.

Palladium was incorporated into the base of Catalyst 6A in the standard manner of Example 2 except that the pH of the equilibration solution was maintained at 4.5. The catalyst was then dried for 3 hours at 120°C, calcined (in static air) for 3 hours at 200°C, 3 hours at 350°C and 15 hours at 550°C. The finished catalyst contained 0.98% Zn and 0.7%w Pd.

Additional zinc was added to Catalyst 6B by slurrying the stabilized zinc-Y-faujasite base for 2 hours with $Zn(NO_3)_2$ at a pH of 5.0 after the 800°C calcination step. Palladium was then incorporated in the same manner as for Catalyst 6A except that the equilibration pH was 6.0. The finished catalyst contained 7.2%w Zn and 0.68%w Pd.

These catalysts were then used in a single stage process to hydrocrack a catalytically cracked feedstock having a 25.5° API gravity, a boiling range of about 115° to 360°C and containing about 350 ppm organic nitrogen. Operating conditions were as follows: pressure, 1500 psig; hydrogen to oil molar ratio, 10/1; LHSV, 1.25. The temperature required to achieve a conversion of 67%w feed to products boiling below 199°C was used as a measure of catalyst performance. The test results were as follows:

TABLE 3

| | Temperature Required for 67%v Conversion to Products Boiling Below 199°C, °C | |
|---|---|---|
| Days | Catalyst 6A | Catalyst 6B |
| 2 | 370 | 364 |
| 4 | 378 | 369 |
| 6 | 383 | 369 |
| 8 | 387 | 369 |
| 10 | 388 | 373 |
| 12 | 390 | 374 |
| 14 | 392 | 374 |

The low zinc content catalyst 6A showed lower activity than the high zinc catalyst 6B as indicated by higher temperatures required for conversion. Catalyst 6A also showed a significantly greater activity decline rate (temperature increase) than catalyst 6B during the first week of operation. Catalyst 6B rapidly reached stable operation at about 370°C. After 9 days operation under these conditions the required conversion temperature was still stable at 375°C while the catalyst 6A conversion temperature requirement continued to rise.

EXAMPLE 6

This example demonstrates the stability of a low zinc catalyst of the invention (<6%w) as a second stage catalyst in a hydrocracking process where the organic nitrogen content of the feed to the second stage is above 25 ppm and the effluent from a first stage is passed to the second stage without removing ammonia or gaseous sulfur compounds.

For this test catalyst 7A was prepared in the same manner as catalyst 6A (Example 5) except that the pH of the $Zn(NO_3)_2$ solution in which the base was initially slurried was 5.5 instead of 4.5 and the final calcination was in flowing air rather than static air. This change was made to reduce the moisture present in the early stages of calcination. The finished catalyst contained 1.60%w Zn and 0.99%w Pd.

The catalyst was used in the second stage of a process to hydrocrack the effluent from a first stage which had reduced the organic nitrogen content of a 50/50 mixture of catalytically cracked and straight run gas oils to 30 ppm. The feed to the first stage had a 22.0° API gravity, a boiling range of about 250°–375°C, and contained 0.6%w S and about 1300 ppm nitrogen. Operating conditions were as follows: pressure, 1500 psig; hydrogen to oil molar ratio, 15/1; LHSV, 1.5. The temperature was adjusted as required to maintain 67% conversion to products boiling below 199°C. The test results were as follows:

TABLE 4

Temperature Required for 67%v Conversion to Products Boiling below 199°C Naphtha, °C

| Days | Catalyst 7A |
| --- | --- |
| 2 | 373 |
| 4 | 377 |
| 6 | 380 |
| 8 | 380 |
| 10 | 381 |

The excellent stability is illustrated by the low rate of temperature increase over the test period.

EXAMPLE 7

This example demonstrates that a high zinc content zeolite base (6–9%w Zn) is preferred over low-zinc zeolites (<6%w Zn) in the second stage of a hydrocracking process where the total effluent from the first stage is passed to the second stage without removing gaseous nitrogen and sulfur compounds and the organic nitrogen content of the feed to the second stage is above 50 ppm. The nitrogen content can rise above this level when the first stage catalyst has lost some of its effectiveness for nitrogen removal.

Catalyst 6B (Example 5) having 7.2%w zinc and catalyst 7A (Example 6) having 1.6%w zinc were tested at feed nitrogen contents of 30 and 100 ppm using the same feed and operating conditions as in Example 6. For the 100 ppm nitrogen content the temperature of the first stage was reduced to allow the organic nitrogen content of the first stage product to increase from 30 to 100 ppm. After stable operation was reached at each condition the products were tested for quality. The test results were as follows:

TABLE 5

| Catalyst | 6B-1 | 6B-2 | 7A | 7B |
| --- | --- | --- | --- | --- |
| Organic Nitrogen to Second stage, ppm | 30 | 100 | 30 | 100 |
| Hours in Operation | 340 | 533 | 214 | 273 |
| Second Stage Temp., °C | 391 | 399 | 381 | 395 |
| Selectivity, %v | | | | |
| $C_1$–$C_3$ | 4.0 | 4.3 | 1.9 | 3.2 |
| $C_4$ | 9.4 | 9.2 | 5.5 | 9.3 |
| $C_5$–$C_6$ | 19.3 | 20.2 | 16.2 | 21.7 |
| $C_7$–199°C | 67.3 | 66.3 | 76.4 | 65.8 |
| Iso/Normal Paraffin Ratio | | | | |
| $C_4$ | 1.7 | 1.5 | 1.6 | 1.4 |
| $C_5$ | 7.6 | 8.6 | 3.3 | 4.4 |
| $C_6$ | 16.9 | 19.5 | 6.6 | 8.4 |
| Hydrocarbon Type ($C_7$–199°C), %v | | | | |
| Paraffins | 21.2 | 20.6 | 23.1 | 23.4 |
| Naphthenes | 53.3 | 49.2 | 60.7 | 55.5 |
| Aromatics | 25.5 | 30.5 | 16.2 | 21.0 |

Where the feed has a high organic nitrogen content catalyst 6B-2 is superior to catalyst 7B in all respects, e.g., a higher selectivity to $C_7$–199°C gasoline, higher iso/normal paraffin ratios and a greater percentage of aromatics in the gasoline fraction.

Surprisingly, catalyst 6B-2 demonstrates a promotional effect of zinc when processing higher organic nitrogen feedstocks. Catalyst 7B, as well as other low zinc/palladium Y-faujasite catalysts, required nearly 15°C higher temperature than catalyst 7A in the second stage when the nitrogen content of the feed was increased from 30 ppm to 100 ppm. However, catalyst 6B-2 required only 8°C higher temperature than catalyst 6B-1 for the same change in nitrogen content. Thus, it appears that the improved performance in the presence of high organic nitrogen contents must be attributed to the zinc content rather than the hydrogenation activity due to the palladium.

EXAMPLE 8

To demonstrate the versatility of zinc-containing zeolites in various hydrocracking processes a zinc Y-faujasite was prepared by the method used in Example 5, including the incorporation of 20%w $Al_2O_3$ as a binding agent and drying at 120°C. Nickel and tungsten were incorporated into the zeolites by four ion exchanges with a boiling solution of 1.0 M nickel and 0.004 M ammonium metatungstate. The composition was washed with boiling water after each exchange, dried at 120°C for 16 hours and calcined at 550°C for 2 hours. The finished composite (catalyst 8) contained 22%w Ni; 1.9%w W; 1.3%w Zn; and 0.14%w Na.

This catalyst was used in a single-stage process to hydrocrack the catalytically cracked feedstock of Example 5. The same operating conditions of Example 5 were used except that the LHSV was 1.5 instead of 1.25. After 30 days operation the temperature required to achieve a conversion of 67%w feed to products boiling below 199°C was 374°C. The temperature decline after reaching stable operation was 0.15°C per day. These results show that the nickel tungsten zinc-containing zeolites are preferred over the palladium zinc zeolites in a single stage hydrocracking process.

Catalyst 8 was then used in the second stage of a process to hydrocrack the feedstock described in Example 6. The same operating conditions were used, as for Example 6, except the hydrogen to oil molar ratio was 12/1 instead of 15/1. After 30 days operation under these conditions the temperature required to achieve 67%w conversion was 389°C and the decline rate was 0.15°C per day. For this test the feedstock was pretreated to 3 ppm organic nitrogen in the first stage process. Again excellent activity and catalyst stability were realized.

Finally, catalyst 8 was used to hydrocrack previously hydrotreated catalytically cracked gas oil containing 36%v aromatics, 2400 ppm sulfur and 4.2 ppm nitrogen. The feedstock had a gravity of 3.0°API and a boiling range of about 150°–380°C. The hydrocracking conditions were: pressure, 1500 psig; LHSV, 2.0; hydrogen/oil molar ratio, 10/1. Again the temperature was adjusted as necessary to give about 67% conversion per pass to hydrocarbons boiling below 199°C. After 30 days operation the temperature requirement was 338°C and the decline rate was 0.2°C per day. The low temperature required demonstrates the superior activity of this catalyst in a conventional process. The low decline rate also demonstrates that these catalysts have good stability.

These examples illustrate the distinct chemical nature of zeolites prepared according to the method of my invention, which includes the combined effects of the zinc incorporation and 800°C calcination. They also illustrate the feature of the preparation which can be utilized to product useful catalysts having high stability and acidic activity tailored to the various process needs. Thus disclosed, the numerous means of effective utilization of these catalysts will be apparent to those skilled in the art.

I claim as my invention:

1. A process for the hydroconversion of a hydrocarbon fraction which comprises contacting a hydrocarbon feedstock in the presence of hydrogen under suitable hydroconversion conditions with a catalyst which comprises a hydrogenation component selected from the group consisting of Group VIB and Group VIII and mixtures thereof, a zinc-containing crystalline aluminosilicate zeolite having faujasite structure and alkali metal content of less than 1%w, prepared by a method which comprises:
   a. removing alkali metal ions from an alkali metal form of zeolite having a faujasite structure to a level below about 1%w;
   b. incorporating zinc ions into the zeolite of reduced alkali metal content, followed by
   c. calcining at a temperature between about 775° to 825°C.

2. The process of claim 1 wherein the hydroconversion is the hydroisomerization of normal paraffin hydrocarbons having from four to seven carbon atoms, the hydroisomerization conditions include a temperature of about 200° to 350°C, a pressure from about 300 to 750 psig, a hydrogen to oil molar ratio from about 1/1 to 25/1, and a weight hourly space velocity from about 0.5 to 10 and the hydrocarbon component is a Group VIII noble metal.

3. The process of claim 1 wherein the hydroconversion is the hydrocracking of a feedstock boiling substantially above the boiling range of the desired products, the hydrocracking conditions include a temperature of about 260° to 450°C, at a hydrogen partial pressure of about 500 to 2000 psig, a hydrogen to oil molar ratio of about 5 to 50 and an LHSV of about 0.5 to 5.

4. The process of claim 2 wherein the zeolite is washed to remove unexchanged ions after step (b) and incorporated with a hydrogenation component consisting of platinum or palladium.

5. The process of claim 4 wherein the wash solution is ammonium nitrate.

6. The process of claim 3 wherein the zeolite is washed to remove unexchanged ions after step (b) and incorporated with a hydrogenation component consisting of nickel and tungsten after step (c).

7. The process of claim 3 wherein the removal of alkali metal in step (a) is accomplished by ion exchange with an ammonium ion solution.

* * * * *